(12) United States Patent
Murotake

(10) Patent No.: US 7,404,074 B2
(45) Date of Patent: Jul. 22, 2008

(54) SELF-BOOTING SOFTWARE DEFINED RADIO MODULE

(75) Inventor: David K Murotake, Nashua, NH (US)

(73) Assignee: SCA Technica, Inc., Nashua, NH (US)

( * ) Notice: Subject to any disclaimer, the term of this patent is extended or adjusted under 35 U.S.C. 154(b) by 721 days.

(21) Appl. No.: 10/618,950

(22) Filed: Jul. 14, 2003

(65) Prior Publication Data

US 2006/0015674 A1    Jan. 19, 2006

Related U.S. Application Data

(60) Provisional application No. 60/395,871, filed on Jul. 12, 2002.

(51) Int. Cl.
  *G06F 1/24* (2006.01)
(52) U.S. Cl. .......................... 713/100; 713/1
(58) Field of Classification Search ............. 713/1, 713/2, 100
  See application file for complete search history.

(56) References Cited

U.S. PATENT DOCUMENTS

| | | | |
|---|---|---|---|
| 5,530,814 A | 6/1996 | Wong et al. | |
| 6,052,600 A | 4/2000 | Fette et al. | |
| 6,091,715 A | 7/2000 | Vucetic et al. | |
| 6,181,734 B1 | 1/2001 | Palermo | |
| 6,366,622 B1 | 4/2002 | Brown et al. | |
| 6,504,867 B1 | 1/2003 | Efstathiou | |
| 6,526,110 B1 | 2/2003 | Bao et al. | |
| 2001/0032318 A1 | 10/2001 | Yip et al. | |
| 2001/0053970 A1 | 12/2001 | Ford et al. | |
| 2002/0082044 A1 | 6/2002 | Davenport | |
| 2002/0083432 A1* | 6/2002 | Souissi et al. | 717/178 |
| 2002/0183013 A1 | 12/2002 | Auckland et al. | |
| 2003/0050055 A1 | 3/2003 | Ting et al. | |
| 2003/0220988 A1* | 11/2003 | Hymel | 709/220 |

FOREIGN PATENT DOCUMENTS

| WO | WO 01/90891 A1 | 11/2001 |
|---|---|---|
| WO | WO 02/05444 A1 | 1/2002 |
| WO | WO 03/028228 A2 | 4/2003 |

OTHER PUBLICATIONS

PCT International Search Report dated Jun. 29, 2004 of International Application No. PCT/US03/22089 filed Jul. 14, 2003.

(Continued)

*Primary Examiner*—Rehana Perveen
*Assistant Examiner*—Paul B Yanchus, III
(74) *Attorney, Agent, or Firm*—Vern Maine & Associates

(57) ABSTRACT

The invention in the simplest form is a self-booting software defined radio (SDR) module which may be embodied as a PCMCIA, Compact Flash, or other plug in form factor module. The performance characteristics of the module, may include the radio frequency (RF) carrier frequency, instantaneous RF bandwidth, carrier modulation and demodulation, symbol coding and decoding, security, and network protocol that can be altered and saved by means of computer software transferred to the module from a host device such as a cellular telephone, personal digital assistant, lap top computer or other programming device.

10 Claims, 9 Drawing Sheets

OTHER PUBLICATIONS

Murotake, David K., "Use of Switched Fabrics in Implementation of Software Defined Radio Smart Antenna and Interference Cancellation Signal Processing", Jan. 23, 2003, pp. 1-6, SCA Technica Inc., Nashua NH.

Murotake et al, Real-Time Implementation of a Reconfigurable IMT-2000 Base Station Channel Modem, Software and DSP in Radio, IEEE Communications Magazine, Feb. 2000, pp. 148-152.

Blust, Stephen and Murotake, David, Software-Defined Radio Moves into Base-Station Designs, Wireless Systems Design, Nov. 1999, pp. 31-40.

Bernier, Steve and Latour, Capt Hugues, Software Communications Architecture Reference Implementation (SCARI) Project, Software Defined Radio Forum, Jan. 29, 2002, pp. 1-43.

Xilinx, Virtex-II Pro Platform FPGAs: Introduction and Overview, DSO83-1 (v2.0) Jun. 13, 2002, pp. 1-7.

Fewer, Colin, Cross Bar Switch Implemented in FPGAs, Xilinx WP166 (v1.0), Sep. 9, 2002, pp. 1-18.

Shah, Alok, An Introduction to Software Radio, Vanu, Inc., 2002, pp. 1-5.

Schoeberl, Martin, Using JOP at an Early Design Stage in a Real World Application, JOP Design, pp. 1-14, no date.

Kohno et al, Universal Platform for Software Defined Radio, pp. 1-4, no date.

Murotake, David, SDR Base Station Models—Multiprocessing, SDR Forum Document No. SDRF-00-T-0062-V0.0, Nov. 16, 2000, pp. 1-16.

Murotake, David, JTRS SCA Platform Hardware Scalability, SDR Forum Document No. SDRF-01, Nov. 13, 2001, pp. 1-16.

SDR Forum, SDR Primer, pp. 1-6, no date.

Xilinx, Software Defined Radio & 4G Development, pp. 1-67, no date.

* cited by examiner

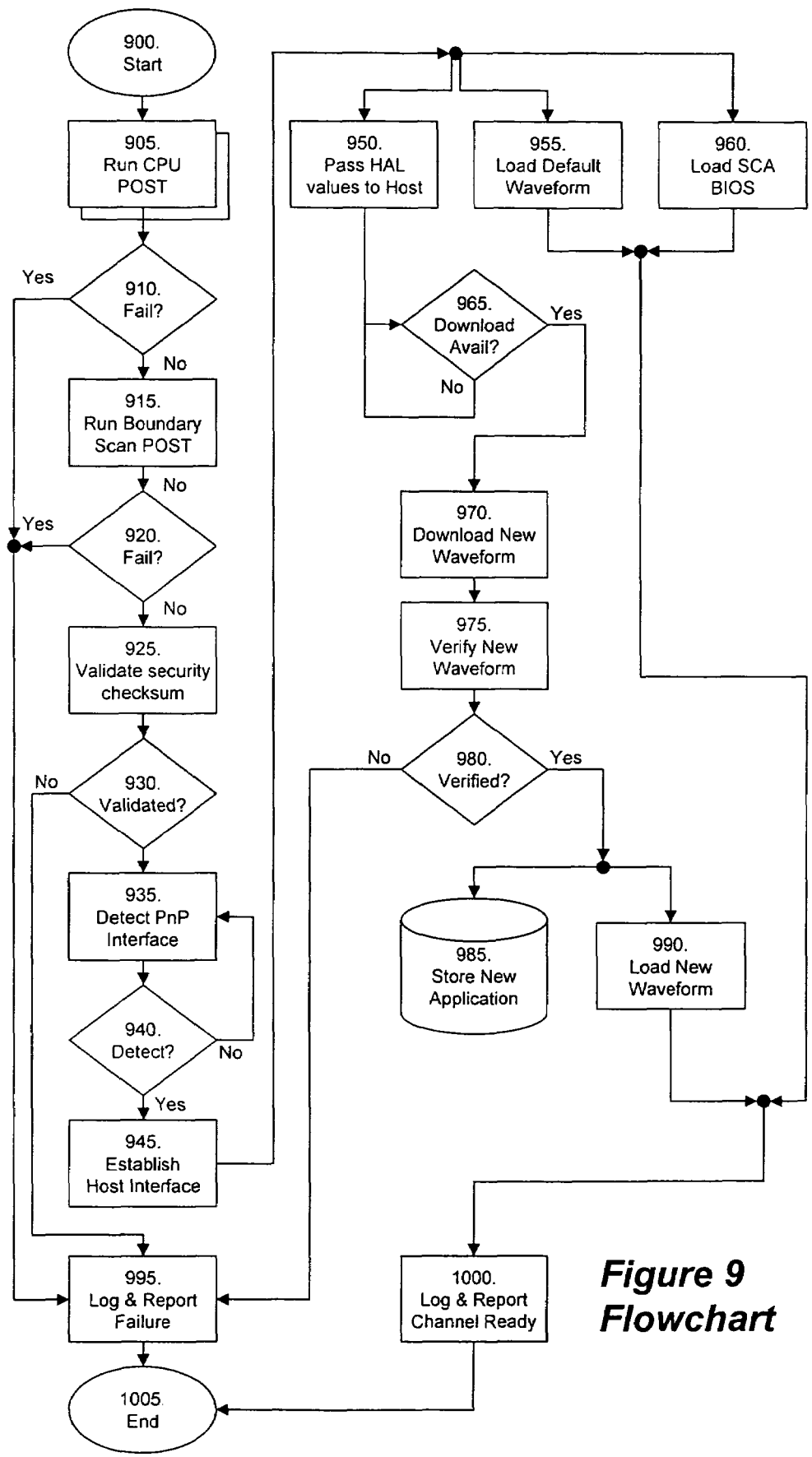
*Figure 9 Flowchart*

SELF-BOOTING SOFTWARE DEFINED RADIO MODULE

RELATED APPLICATIONS

This application claims the benefit of U.S. Provisional Application No. 60/395,871, filed Jul. 12, 2002, which is herein incorporated in its entirety by reference.

STATEMENT OF GOVERNMENT INTEREST

Portions of the present invention may have been made in conjunction with Government funding under contract number F30602-03-C-0183, and there may be certain rights to the Government.

FIELD OF THE INVENTION

The present invention relates to wireless communications, and more specifically to software radio (SWR) or software defined radio (SDR).

BACKGROUND OF THE INVENTION

As evident from the widespread use of cellular phones, pagers, personal digital assistants (PDA's), wireless laptop computers, and a varied assortment of other data and communications devices—the World has evolved into a highly connected society. Despite the abundance of devices for transmitting and receiving information, there are connectivity related problems between the individual devices as well as the underlying infrastructures employed in the transmission and reception.

The inability of wireless devices tends to be related to the specific implementation utilized in the design. Thus, while the general hardware elements are similar, the design limits the usage to a very particular deployment. For example, cellular phones tend to be protocol specific, so a person that switches from Sprint PCS cellular service to another provider will have to replace the entire phone. Other devices suffer from the same difficulties, and accessories and other implementation schemes have to be used to provide interconnectivity.

A proposed solution to the non-standardized communications operations lies in the software defined radio (SDR) architecture. In general, software defined radios (SDRs) is used to describe radios that provide software control and reconfiguration of a variety of modulation techniques, wideband or narrow-band operation, communications security functions (such as hopping), and waveform requirements of current and evolving standards over a broad frequency range. The frequency bands covered may still be constrained at the front-end requiring a switch in the antenna system.

Since the initial developments in the early 1990's, researchers have been feverishly working on making SDR a reality. As stated, a software defined radio is a radio whose channel modulation waveforms are defined in the software. Waveforms are generated as sampled digital signals, converted from digital to analog via a wideband digital to analog converter (DAC) and possibly upconverted from an intermediate frequency (IF) to a radio frequency (RF). On the receiver end, a wideband Analog to Digital Converter (ADC) captures all of the channels of the software radio node. The receiver then extracts, downconverts and demodulates the channel waveform using software on a general purpose processor. By employing common hardware elements and implementing design changes via the software, the end-user obtains a seamless transition between various protocols and the life cycle of the device is greatly enhanced.

SDR is an enabling technology applicable across a wide range of areas within the wireless industry that provides efficient and comparatively inexpensive solutions to several constraints posed in current systems. For example, SDR-enabled user devices and network equipment can be dynamically programmed in software to reconfigure their characteristics for better performance, richer feature sets, advanced new services that provide choices to the end-user and new revenue streams for the service provider. SDR is uniquely suited to address the common requirements for communications in the military, civil and commercial sectors.

There are various types and implementations of SDR architectures, such as modal SDR and reconfigurable SDR, depending upon the application. There are practical considerations related to cost, size, power, and weight to contend with in addition to the performance characteristics desired.

A basic block diagram of the SDR functional blocks is shown in prior art FIG. 1. As the goal is to employ generic functional hardware blocks, the interface and internal processing becomes important. There are various high-level hierarchical functional models for SDR systems. In general, there are four functional areas that need to be addressed by the SDR, namely front end processing 50, information security 30, information processing 25, and control 35.

Front end processing 50 refers to input/output (I/O) interface, the front-end RF processing, the RF/IF up/down conversions and the change between digital and analog signals. Modulation/demodulation processing is considered part of the front end processing.

In a typical scenario, an antenna 5 is coupled to the RF section 10. The antenna 5 is for both transmission and reception in conjunction with the RF section 10 for those applications requiring both transmission and reception. The RF section 10 is well known in the art and generally encompasses diplexers, amplifiers and filters. The diplexer is a type of switch that allows a single antenna to transmit and receive signals, whereas other designs employ separate antennas for transmitting and receiving. For reception, the antenna 5 typically feeds an input signal to an amplifier stage to boost the signal to acceptable levels. The IF section 15 usually employs one or more mixers to downconvert the RF signal to the IF frequency by mixing the RF signal with the local oscillator signal and using the difference signal as the IF. Filtering can be used to extract known noise or unwanted/extraneous signals along with multiple mixer and amplification stages.

The DAC/ADC stage 20 is used to convert digital-to-analog and analog-to-digital processing. For received signals, the analog IF signal is coupled to an analog to digital converter (ADC) converter converts the analog signal to digital samples that is then digitally processed in the baseband section by some processing engine 25. The signal processing extracts the information signals which are then delivered to the appropriate function via an interface connection.

Information security 30 is employed for the purpose of providing user privacy, authentication, and information protection. In the commercial environment, this protection is specified by the underlying service standard while in the military arena this protection is consistent with the various Governmental doctrines and policies in effect.

A processing engine 25 is used for information processing for decomposing or recovering information signals containing data, control, and timing. Content processing and I/O functions map into path selection (including bridging, routing, and gateway), multiplexing, source coding, signaling protocol, and I/O functions.

The SDR architecture is designed to support functions connected through open interfaces, and procedures for adding software specific tasks to each of the functional areas. The software applications for the open architecture consist of multiple subsystems interconnected by open interfaces, wherein the subsystems are determined by implementation considerations. Each subsystem typically contains any required hardware, resident firmware, an operating system, and software modules that may be common to more than one application. Interfaces link the software application to specific modules within each subsystem. The application layer tends to be modular, flexible, and software specific, with a common software API layer.

The functional interface of the SDR architecture has interfaces that are implementation dependent with data and information traffic exchanged between the functional blocks along the interfaces. The interfaces can be described as information and control oriented with control over each of the functional blocks. The information transfer, control and status data is between the various functional blocks including the antenna, RF section, IF section, processing engine, security section, and control interface. As an example, frequency at which a wireless signal is generated is determined the RF section and can be changed to accommodate different operating environments such as moving between regions with different frequency assignments.

SDR is more easily implemented in wireless devices and the handheld devices employing SDR generally have performance limitations that are dependent on the battery power, size, weight, and cost requirements. Implementing SDR into laptops and automobiles present differing criteria but using the underlying principles.

One example of the potential for SDR lies in the wireless cell phone area. Existing communications network, such as cellular, use radios to operate with a specific wireless data network. As a user travels outside of the coverage area of its chosen wireless data network, the radio signal is lost. Although some wireless data networks have established cooperative roaming agreements that allow a user with a compatible radio design to operate on a second, foreign wireless data network. But, the roaming agreements only help to alleviate coverage limitations and cannot provide for seamless, widespread operation due to the existence of wireless data network incompatibilities.

Current wide area wireless voice and data networks communicate using different technologies, such as Code Division Multiple Access (CDMA), Time Division Multiple Access (TDMA), Global System for Mobilization (GSM), Cellular Digital Packet Data (CDPD), DataTac, Mobitex, and General Packet Radios Service (GPRS). The utilization of various frequency bands also segregates wireless networks. While portable radio devices have emerged offering limited operation on multiple frequency bands, few commercial devices have been realized that can provide multiple communication modes. Thus, when a user enters a region serviced by a non-compatible wireless data network, the user may need to either rent or purchase a radio that is compatible with that region's local network.

Existing cellular radios commonly communicate via a single cellular service, for example, analog, Personal Communication Service (PCS), CDMA, TDMA, GSM, or Iridium service. The radio typically communicates by generating and receiving a waveform that is fixed throughout the lifetime of the radio. A problem with such a radio is that when a user moves from a "home" location to a "remote" location, the radio is not easily configurable to communicate at the remote location, as that location has coverage via a different service. For example, when a user travels overseas, the user's radio does not support a service that is available at the home location. In such situations, the user may need to, for example, rent or purchase a radio that is compatible with local communication equipment.

Another problem is when existing radios need to update or receive a software application (e.g., wireless email, operating system). Typically, a radio is taken into a service center to update or receive an application so that the radio can provide a service associated therewith, which is time consuming and expensive.

Frequently, users of radios such as police, federal agency, and military encounter difficulties when attempting to interoperate communication equipment. For example, when a representative from the Federal Bureau of Investigation (FBI) travels to a remote location, the representative may need to borrow equipment from regional officials to communicate with local police and fire services. This problem was identified and initiatives under the Homeland Defense legislation are seeking to improve communications between various domestic agencies. Similarly, in the military community, a Navy ship may desire, for example, to make and receive phone calls at a port at a remote location via local infrastructure equipment. Frequently, existing systems do not allow interoperability between military and local communication equipment. Thus, a problem with existing systems is interoperability between communications equipment, and the additional complexity and expense to "translate" from one communication technique to another.

Another problem with existing radios, including original manufactured and those serviced/repaired, is verifying when a radio meets a predetermined specification for communications. For example, when the Federal Communication Commission (FCC) needs to validate that a radio meets a predetermined specification (e.g., noninterference, splatter, noise, out-of-band noise) a method to verify the specification is needed to ensure a radio operates according to regulatory restriction. In other words, the FCC needs to verify the performance for different types of radios within predetermined specifications when performing communication operations.

The SDR technology enables flexible radio systems with multi-serviced, multi-standard, multi-band operation via reconfigurable and re-programmable software instructions. The flexibility of a software defined radio derives from the ability to operate in a multi-serviced environment without being constrained to a particular standard but able to offer services in an already standardized or future system, on any radio frequency band.

The basic concept is based on the use of a simple hardware platform built using SDRs to enable customers to modify both the network and the end-user device to perform different functions at different times. It performs the majority of signal processing in the digital domain using programmable DSPs and hardware support, but some signal processing is still done in the analog domain, such as in the RF and IF circuits. There are numerous implementations utilizing the SDR architecture. For example, one variation has the antenna connected directly to an ADC/DAC converter and all signal processing is done digitally using fully programmable high speed DSPs. In general, the SDR architecture permits all functions, modes, and/or applications, to be reconfigurable via software. Such a system in flexible, reduces obsolescence, enhances experimentation, and brings together the analog and digital environments.

Devices that implement SDR technology are programmable, have multiband/multimode capability, provide simultaneous voice, data, and video and offer full convergence of digital networks and radio science. Such smart radios configure themselves to perform the communications task requested using different frequency bands, modes, etc., and even selecting the optimal communications format. The processing system of the radio can include cognitive functions that learn about the operating environment such as other users nearby, interference, location, and elevation, to be optimally configured to maximize efficiency and reduce interference.

End-users have greater choices and can easily implement "pay as you go" features. There is device independence with scalable hardware that enhances compatibility on a global scale. The manufacturers and also reap great benefits by reusing stock hardware and having lesser number of models. The network providers simply service offerings without having to support a large number of different protocols and standards.

The SDR concept spans all types of wireless handhelds from cellular phones to feature phones, smart phones, PDAs, computing devices and even smart appliances. The most prominent and immediate area of adoption is in the communications field. Today's digital cellular and PCS networks use a variety of second generation (2G) digital technologies for the air interface link between the terminal and network and embrace a number of standards (e.g. GPRS, HSCSD etc.) and protocols (WAP, pJAVA, compact_html etc.) for accessing the Internet. The divergent 2G standards (adopted by large groups of end-users around the globe) often frustrate business travelers who communicate with their customers or offices while traveling from one network type to another as they cannot use the same device without significant enhancements/adjustments to deal with incompatible systems. To add to the complexity, the wireless industry is in the throes of migrating to next generations of these standards, as well as introducing technologies such as GPS (for location services), Bluetooth (for local communications), and the like. SDR offers the ideal solution to accommodate the many standards, frequency bands and applications by offering end-user devices that can be programmed, fixed or enhanced by over-the-air software. With SDR, one would implement a common hardware platform and accommodate these standards and technologies via software modules and firmware.

Due to the theoretical advantages being proposed for SDR, several groups from the commercial, civil, military and academic areas have implemented studies through cooperative research. There is even a forum for SDR that brings together major players from around the globe to attempt to establish a common framework and to cooperatively integrate the concepts into current and evolving commercial standards. The goal of the industry is to lower the development cost and cost of ownership of wireless communication equipment. The US and many international governments and numerous commercial companies are seeking to implement all signal processing for a wireless device in software. Thus any change to the modulation, equalization, or bandwidth, is simply a software upgrade to the system.

SDR enhances and extends the capabilities of current and proposed wireless standards and serves as an enabler of choice as well for Internet concepts and business models in the wireless industry. In each of the major market sectors, Commercial, Military and Civil, SDRs enable new applications as described herein. In particular, some of the benefits include: True international connectivity; Portable Command Station for crisis management; Secure, encrypted Location awareness; Inter-agency communications when desired; Mission reconfigurability; "Freedom of Choice"—applications, band/protocols; MP3AM/FMMedia Distribution; Interactive betting; CD quality music; Instant routing of emergency information; Options to select communications channel by availability; Virtual private network-Closed user groups; Real-time flexibility; Media Distribution; Portable Command Post; Combined delivery of e-mail, voice mail, messages and FAX; Integrated radio, router, computer; Browser malleability; International connectivity to prevailing networks.

The SDR Forum has been working closely with global standards bodies and other industry groups such as RAST, 3GPP and ANSI to develop the standards for bringing SDR to full commercial viability. There are many published materials related to SDR and various designs and proposals of operation, however there is still a general disagreement as to the optimal form, features, or unifying standard. In the article Universal Platform for Software Defined Radio, as well as the corresponding patent application WO 02/05444A1, the general background is well described.

U.S. Pat. No. 6,052,600 discloses a software defined radio which communicates with a base station to receive valid operation licenses and appropriate software configuration instructions in order for the radio to communicate over a plurality of wireless data networks. If the system is unable to obtain sufficient information from a base station prior to losing a current wireless data network connection, the radio is not able to dynamically select a new software configuration and wireless data network without directions from the base station.

In U.S. Pat. No. 6,526,110 there is disclosed a device that receives and demodulates digital signals encoded in multiple formats. The apparatus includes multiple processor units and a memory embedded with the processor units, and a cache connected to each of the processor units. The cache for communicating between the plurality of processors. The embedded memory can include data and instruction memory. The processor units and memory are configured as a multi-mode receiver demodulator front-end capable of receiving digitally modulated signals in multiple formats, and demodulating the signals in real-time in response any one of the multiple formats.

In U.S. Pat. No. 6,181,734 a software defined radio is disclosed in which different waveforms may be utilized. The radio includes a memory (801) in which software (802, 805, 806) for specific waveforms is stored. The radio further includes one or more processors (807, 809, 811) which extract waveform specific software to process information for transmission or reception. All processing of the information between reception or reproduction of speech and transmission and reception of radio frequency signals, respectively, is performed in software.

Thus, there are enormous benefits to the widespread use of SDR technology in portable communications devices. The prior references demonstrate the practicality of using reconfigurable signal processing and computing resources to implement a SDR, and there have been some forays into commercialization. However, despite all the attempts in the art, there has yet to emerge a scheme that fulfils the industry requirements and addresses all the aforementioned problems. What is needed is a system that provides the standardized building blocks for SDR such that the scheme is flexible, easy to implements, cost-effective, and alleviates the problems known in the art such that it is accepted by the industry at large.

BRIEF SUMMARY OF THE INVENTION

The present invention has been made in consideration of the aforementioned background. One object of the invention is a self-booting software defined radio (SDR) module. Such a module may be embodied as a PCMCIA, Compact Flash, or other "plug in" form factor module. Such a module may also be embodied as an "embedded" module, built-in to the "host" device. The host device can be a cellular telephone, personal digital assistant (PDA), lap top computer or programming device, including any mobile device that requires one-way or two-way communications, including mobile transportation processing devices for use with motor vehicles, airplanes, sailing vessels, and trains. In one variation the performance characteristics of the module, including its RF carrier frequency, instantaneous RF bandwidth, carrier modulation and demodulation (modem), symbol coding and decoding (codec), security, and network protocol can be altered and saved by means of computer software transferred to the module from a host device ("host").

One embodiment includes a self-booting software defined radio (SDR) module that interfaces with a host system, wherein the module comprises a modulation/demodulation section with a stored run-time kernel. There is a processing unit on the modulation/demodulation section executes the run time kernel. An interface mechanism couples the host system to the module, wherein the host system provides a set of reconfiguration information. A front end unit receives communications signals and processes the communications signals using the reconfiguration information. Further variations of this embodiment include a memory unit, wherein the memory unit is selected from the group comprising FLASH memory and RAM. There can also be a multi-port crossbar coupled to the front end unit, which can establish a high speed fabric. While the module can communicate with plug-and-play, it can also be embedded and communicate with the host on a bus. The self-booting software defined radio (SDR) module may be comprised at least partially of reconfigurable logic devices.

Another embodiment includes a software reconfigurable radio/wireless module employing SCA architecture, comprising at least one processor unit, at least one memory unit coupled to the processor unit by a control bus, a plurality of reconfigurable elements, an interface mechanism for transferring reconfiguration information from a host device to the reconfigurable elements at least one radio frequency interface block, and at least one multi-port reconfigurable crossbar switch with bi-directional ports coupling to the radio frequency interface block and to the processor unit.

Yet a further embodiment is a switched fabric software defined radio module, comprising at least two reconfigurable logic device on the module, wherein the reconfigurable logic devices are each comprising a front end unit for transmission and reception of information signals, a processing unit, a memory section, at least one crossbar switch, and a fabric interface, wherein the processing unit, the memory section, and the crossbar switch are coupled to the fabric interface. The switched fabric may be configured as a ring.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 9 is a basic flowchart illustrating the processing within one embodiment of the invention.

DETAILED DESCRIPTION OF THE INVENTION

As noted herein, the SDR architecture is based upon a high-level generic model with specific functional blocks connected via open interface standards recommendations. The SDR architecture supports a plurality of domains including hand-held, mobile, and base-station (or fixed site). Software is implemented by controlling the characteristics of equipment/device subsystems through hierarchical and peer level modules that support scalability and flexible extensions of applications. Modularity allows implementation of software applications within open systems, and between the modules are more defined interfaces. Within a module the developer implements functionality in the most effective way for the particular application.

One aspect of the present invention is a self-booting software defined radio (SDR) module that may be embodied as a PCMCIA, Compact Flash, or other "plug in" form factor module. The performance characteristics of the module, including its RF carrier frequency, instantaneous RF bandwidth, carrier modulation and demodulation (modem), symbol coding and decoding (codec), security, and network protocol may be altered and saved by means of computer software transferred to the module from a host device such as a cellular telephone, PDA, lap top computer or other programming device.

Figure 1:
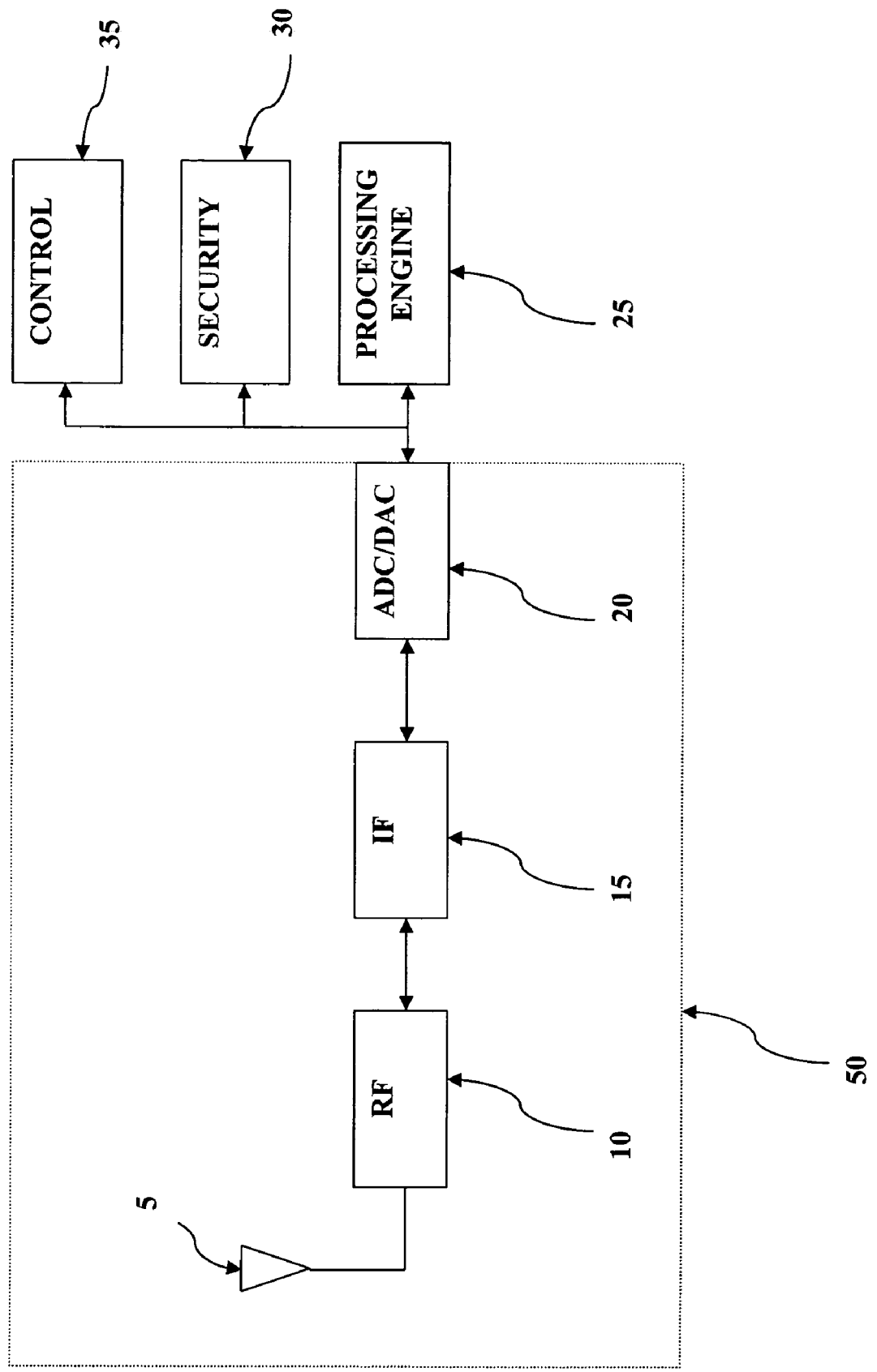
FIG. 1 is a prior art block diagram perspective of basic building blocks of the SDR architecture.
Figure 2:
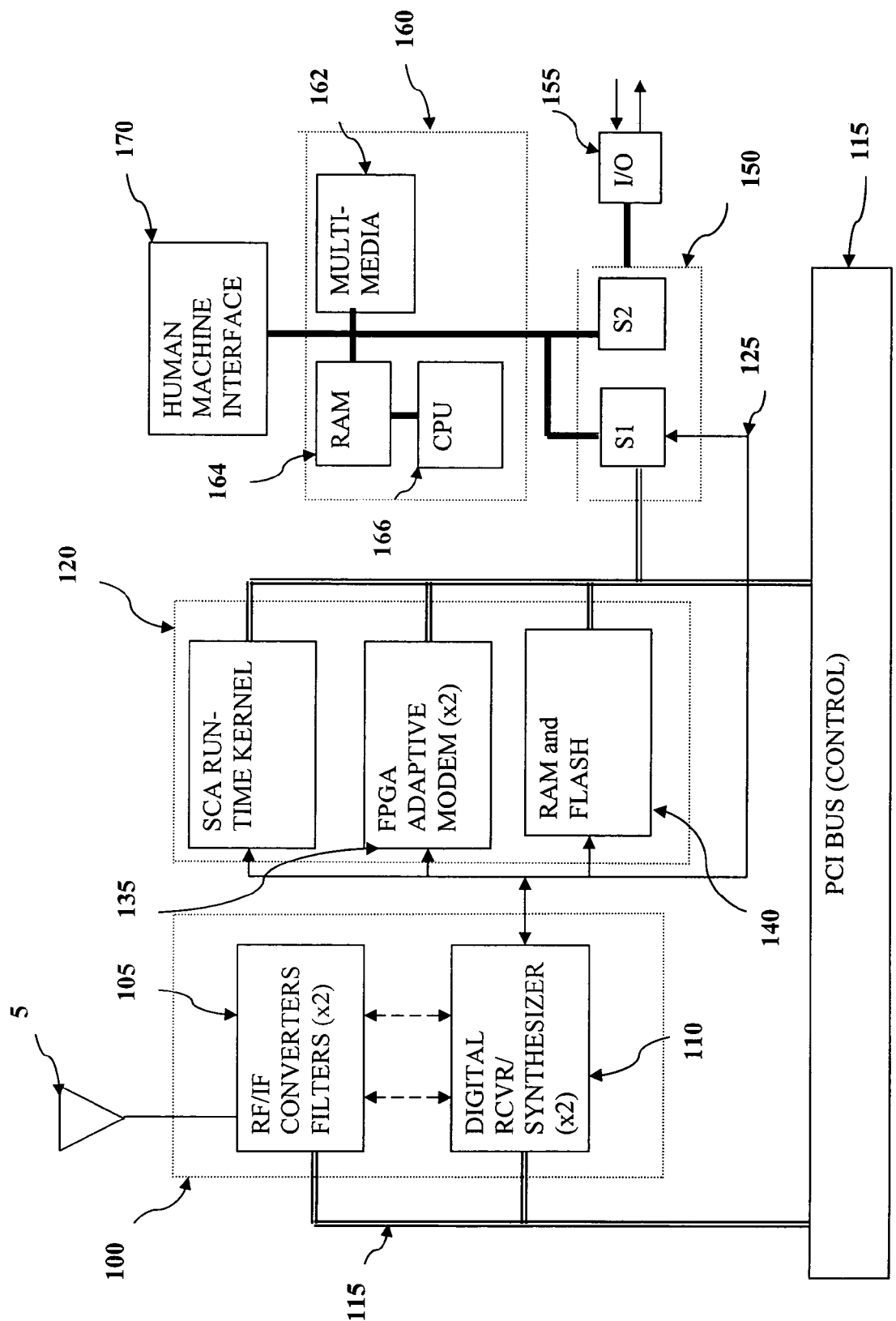
FIG. 2 shows a top-level representation of dual function radio (DFR) illustrating the chipsets for operation with a self-booting ability.

Referring to FIG. 2, which illustrates a dual function radio (DFR) chipset that is compliant with the SCA architecture. The chipset incorporates SDR technology and is self-booting and can be a plug n' play personal computer (PC) card. The module may be inserted into and removed from a host or otherwise built-in (embedded) with the host at the time of manufacture or service.

The antenna 5 in this embodiment is a single antenna for transmission and reception. The antenna 5 is coupled to a front end unit 100 that performs the RF functions involved with frequency conversion and filtering via the RF/IF converters and filters 105. The RF/IF section 105 is coupled to a digital receiver/synthesizer 110 for processing of signals between analog and digital formats as known in the art. The RF/IF section 105 and the digital receiver/synthesizer 110 are both coupled to a control bus 115 such as a PCI bus.

The front end section 100 communicates with the modulation/demodulation section 120 through a high speed fabric 125 for information exchange. In this embodiment the modulation/demodulation (modem) section 120 comprises a SCA runtime kernel 125, a programmable adaptive modem 135 and memory such as RAM and Flash 140. The elements of the modem/demodulation section 120 are all coupled to the control bus 115. In an alternative embodiment, the function of the high speed fabric 125 and control bus 115 may be performed by a single physical bus.

The high-speed fabric also couples to a security chipset 150 for the exchange of information. The security chipset also is coupled to the control bus 115 for control data. The I/O chipset 155 also couples to the security chipset 150 which in turn also couples to the PC chipset 160 and the human machine interface (HMI) 170. The PC chipset 160 generally comprises some multi-media processing 162, memory 164 and a processing unit 166. Further operational details are provided herein.

When inserted into a host, the module adds the capability of multiple radio types, determined by the module's programming. In some embodiments, this may be a software defined single function radio, dual function radio (DFR) or multi-function radio. In some embodiments, the module possesses sufficient hardware and software resources to simultaneously instantiate a plurality of different radio signal types (waveforms), such as IEEE 802.11 Wireless Local Area Network (WLAN) and Bluetooth (BT). In another embodiment, a GPS receiver is simultaneously instantiated with a cellular telephone or personal communication system (PCS) mobile terminal transceiver for GPS-enabled emergency 9-1-1 communication.

Figure 3:
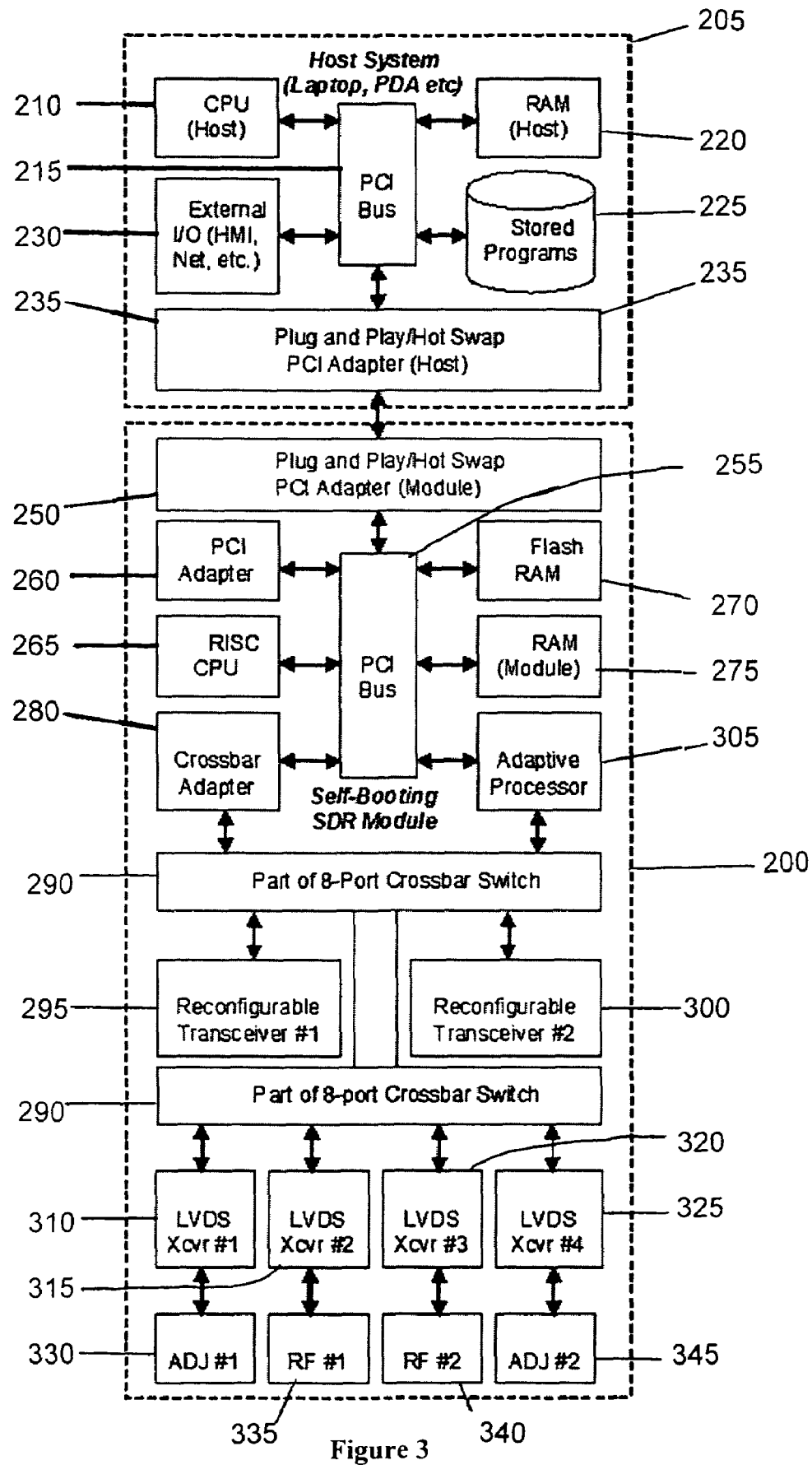
FIG. 3 illustrates a diagrammatic flowchart for the self-booting software defined radio (SDR) module.

Referring to FIG. 3, the functional flow for a multi-mode radio is diagrammatically depicted. In some embodiments, this may be a software defined single function radio, dual function radio (DFR) or multi-function radio. In one embodiment the chipset or module 200 is coupled to a host device 205, such as a cellular phone, laptop computer, personal digital assistant (PDA), and other processing devices such as those in transportation applications. The coupling between the host 205 and the module 200 can be accomplished in numerous methods as detailed herein. The host system 205 has certain requirements such as some processing unit 210 such as a microprocessor or central processing unit (CPU) that can operate on programs. There needs to be some internal component interface such as a PCI bus 215 for data transfer and passing of control and status. Some internal memory is also required, such as host RAM 220 for temporary storage and additional memory for stored programs 225 can be utilized. There is generally an external I/O 230 connection such as HMI (for example—keyboard, display, microphone, speaker) or Internet connectivity. Finally, there needs to be some interface mechanism for coupling the host system 205 with the module 200, which in this embodiment is a plug and play/hot swap PCI adapter 235.

The programming of the SDR module 200 is accomplished in cooperation with the SCA Run-Time Kernel (RTK). The host CPU 210 executes an application program to transfer source code for programming the module 200. The source code for the module 200 can be stored in host random access memory 220, on disk memory 225, or downloaded from a network file server interfacing to the external I/O adapter 230. The host CPU 210 establishes a communication path with the module 200 via the host PCI bus 215 through the Plug and Play (PnP)/hot swap PCI adapters 235.

It should be readily apparent that there are various types of hosts for which the present invention would be adaptable. The module can also be integrated into the host or coupled to the host by some other means such as wired or even wireless.

The components of the self-booting SDR module 200 vary according to the specific application and requirements. For example, a laptop computer can be incorporated with a built in antenna that can be coupled to the module 200 via the host system 205 and include numerous peripheral devices and capabilities with the increased space and power of the laptop. The laptop antennas would enable multiple modes of operation and a selection for optimization. For the SDR module 200 integrated into a cell phone or PDA, the number of peripherals and capabilities would be reduced due to the size, weight, power factors.

Typically, the PCI adapter 260, RISC CPU 265, crossbar adapter 280, crossbar switch 290, reconfigurable transceivers 295, 300, adaptive receiver 305, and the transceivers 310-325 are embedded within a programmable logic device such as a field programmable gate array (FPGA). In one implementation, the transceivers 310-325 employ a serial low voltage differential signaling (LVDS) physical (PHY) layer. These transceivers may be implemented on a Xilinx Virtex II Pro device such as part number XC2V7 or a comparable device. The crossbar switches 290 of the described embodiment are high speed serial switches and allow for interfacing between other processor, the crossbar switch itself, as well as various I/O internal communications. In a typical implementation, the cores for the Switch Fabric Adapter 280 and the Crossbar Switch 290 are configured in the FPGA using VHDL or Verilog firmware programming. While the FPGA is one implementation, it is within the scope of the present invention to incorporate any reconfigurable device. Likewise, the use of serial crossbar switches is for illustrative purpose and is not to be deemed as a limiting factor.

The module 200 may include fixed (non-reconfigurable) cores for the PCI bus adapter 260, the reduced instruction set (RISC) central processing unit (CPU) 265, and the four low voltage differential signaling (LVDS) transceivers 310-325.

The Reconfigurable Transceiver #1, 295 and Reconfigurable Transceiver #2, 300, and the Adaptive Processor 305 are programmed in the FPGA based on the characteristics of the waveforms, and the adaptive processing needed to simultaneously implement the waveforms.

Software programs typically stored on the module 200, such as "boot code" needed for module initialization from power-up, are stored in FLASH memory 270. The boot code includes a minimum Software Communications Architecture (SCA) run time kernel that can include a multiplicity of software components such as a Java Virtual Machine (VM), operating system micro-kernel, basic input/output system (BIOS), CORBA object request broker (ORB) or Java remote method invocation (RMI), application programming interfaces (API), device drivers, power-on self test (POST), and diagnostic/prognostic functions such as IEEE 1149.1 boundary scan support and thermal sensor support.

In one embodiment, the module CPU 265 may be a Java connected device configuration (CDC) or connection limited device configuration (CLDC) "hardware stack" which executes Java byte code as native mode instructions, thereby providing accelerated Java operation and reduced run time memory requirements for the RTK, SCA core framework (CF), waveform software and other software which are stored as Java byte code.

In one embodiment, the module RTK provides application factories, application programming interfaces (API) and drivers for a plurality of SDR and SCA standards developed by a plurality of organizations including, but not limited to, the U.S. Joint Tactical Radio System (JTRS) Joint Program Office (JPO); the Object Management Group (OMG); and the Software Defined Radio Forum (SDRF). This plurality of SDR standards may include an SCA reference implementation (SCARI), a platform independent model (PIM); a platform specific model (PSM); a plurality of middleware platforms including but not restricted to Java, CORBA, PalmOS, Windows CE, and .NET; a hardware abstraction layer (HAL) API; a plurality of multimedia APIs including but not limited to Microsoft DirectX; a plurality of software download APIs including but not limited to the SDR Forum Software Download API; or a plurality of security APIs including, but not limited to, the JTRS SCA 2.2 Security Annex. The RTK can be reconfigured by software download to comply as needed with changes in the standards.

The device configuration and download of waveforms/applications is described in further detail herein. Once the SCA RTK has been "booted", the module 200 is ready to accept firmware programming and software downloads to configure various components of the module 200 including the crossbar switch 290, software defined radio (SDR) transceiver functions 295, 300 and adaptive processing functions 305. These downloads may be in the form of Verilog or VHSIC Hardware Definition Language (VHDL) or other cores for FPGA, or previously compiled executable code for microprocessors and digital signal processors. In one embodiment, a CDC or CLDC processor core optimized for the Java language may also accept software downloads of Java class files (byte code).

Each different radio waveform has a unique configuration of FPGA gates and registers needed for its instantiation, including radio transmitter and receiver functions such as baseband carrier modulation/demodulation, multiple-access multiplexing/demultiplexing for Time Division Multiple Access (TDMA), Code Division Multiple Access (CDMA) or Frequency Division Multiple Access (FDMA), and transmission security methods such as spread spectrum spreading/despreading or frequency hopping/de-hopping. Also, adaptive processing algorithms for antenna diversity combining, adaptive interference mitigation, beam forming, etc. instantiated on the adaptive processor 305 are also dependent on the waveforms instantiated on the reconfigurable transceiver 295, 300. In addition, the data flow between processor elements is also a function of the waveform type and algorithm. Thus reconfiguration of waveforms on reconfigurable transceiver 295, 300 generally requires reconfiguration of the adaptive processing algorithms on the adaptive processor 305, as well as reconfiguration of the 8-port crossbar switch 290 to provide the necessary data flow paths.

In one embodiment, the firmware and software download methods comply with a plurality of industry standards and recommendations including, but not limited to the API and download standards of the Global Mobile (GLOMO) Radio and Antenna API, SCA, Software Defined Radio Forum (SDRF) and Object Management Group (OMG). The source code is validated after download by the module. Executable code for "default" transceiver waveforms and other boot software may be stored on the file storage of the host device, or may optionally be stored on non-volatile memory such as Flash RAM on the self-booting module, which provides the ability to instantiate a "default" radio configuration in the event of a system crash, possibly caused by a faulty waveform or adaptive processing download of faulty software.

Transceiver operation in one embodiment proceeds as follows. Once the software-defined transceivers 295, 300, adaptive processing unit 305 and crossbar switch 290 have been programmed, the module 200 may operates as a single- or dual-channel, dual-mode radio module. One possible configuration is simultaneous operation of Bluetooth (Specification 1.1) and Wireless Local Area Networks (WLAN, IEEE 802.11) waveforms instantiated on transceivers 295, 300. Since these two waveforms operate in the same frequency bands, a multiplicity of means to mitigate interference between the two waveforms may also be performed by downloading appropriate software to the adaptive processor 305 and crossbar switch 290.

Figure 4:
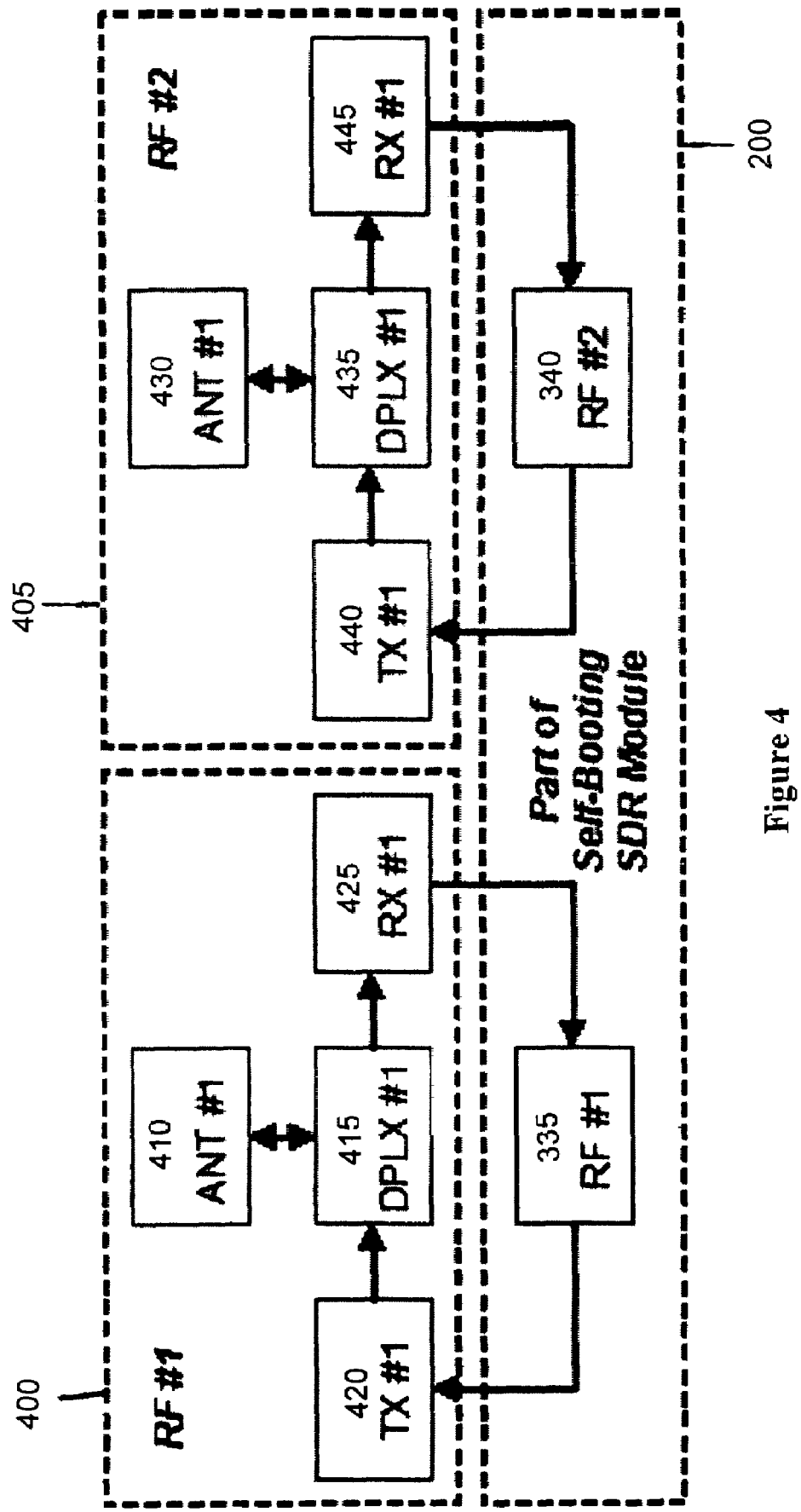
FIG. 4 shows a portion of the self-booting SDR module with respect to the antenna reception for diversity applications.

Referring to FIG. 4, which illustrates one embodiment for coupling the antenna to the module 200. In this embodiment the SDR module 200 uses two RF interface blocks 400, 405 to receive and transmit two signals along two RF signal paths as described in further detail herein. In this embodiment the module 200 includes two radio frequency (RF) receivers 425, 445, two RF transmitters 420, 440, two antenna elements 410, 430, two diplexers 415, 435 among the other elements known to those in the art. Various functionality is described herein and includes module programming and configuration (download), and functional operation of the communications devices once programmed.

The SDR module Port RF #1 335 is connected to the serial digital interface of a digital radio transmitter Tx #1 420 and digital radio receiver Rx #1 425, which are connected to a Diplexer 415 and antenna 410. In like fashion SDR module Port RF #2 340 is connected to the serial interface of digital radio transmitter Tx #2 440 and digital radio receiver Rx #1 445, which are connected to a Diplexer 435 and antenna 430. In this embodiment, the SDR module ports ADJ #1 330 and ADJ #2 345 are unused, but allow for system expansion.

The RF interface blocks 400, 405 can be separate cards in a system, coupled to a host system, or integrated with the host system. For example, a laptop computer can have an antenna element disposed throughout the lid to allow for greater surface area for reception and improved signal quality.

Figure 5:
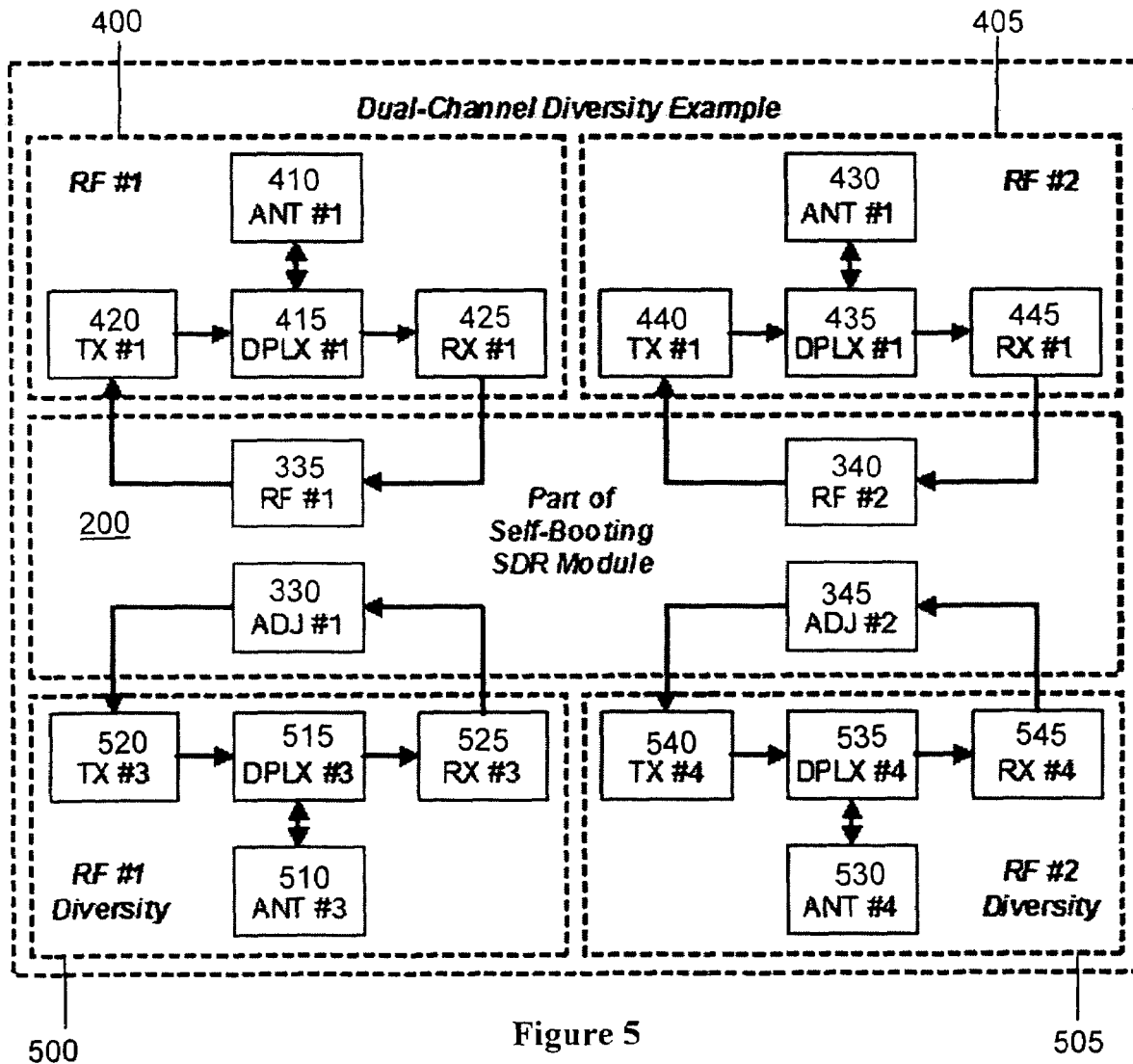
FIG. 5 is an illustration of a dual-channel diversity implementation.

An alternative embodiment shown in FIG. 5 is a dual-channel cellular telephone with diversity antennas, wherein a single self-booting SDR module 200 is connected to two sets of diversity transceivers 400, 405, 500, 505 having four RF transmit and receive signals. Thus, up to four RF signals may be received and generated for the dual channel diversity radio.

In this alternative embodiment, SDR module Port RF #1 335 is connected to the serial digital interface of a digital radio transmitter Tx #1 420 and digital radio receiver Rx #1 425 which are connected to a diplexer 415 and antenna 410. For the first diversity channel, SDR module Port ADJ #1 330 is connected to the serial digital interface of a digital radio transmitter Tx #3 520 and digital radio receiver Rx #3 525, which are connected to a diplexer 515 and antenna 510.

In a similar fashion, SDR module Port RF #2 340 is connected to the serial interface of digital radio transmitter Tx #2 440 and digital radio receiver Rx #1 445, which are connected to a diplexer 435 and antenna 430. For the second diversity channel, SDR module Port ADJ #2 345 is connected to the serial digital interface of a digital radio transmitter Tx #4 540 and digital radio receiver Rx #4 545, which are connected to a diplexer 535 and antenna 530.

Figure 6:
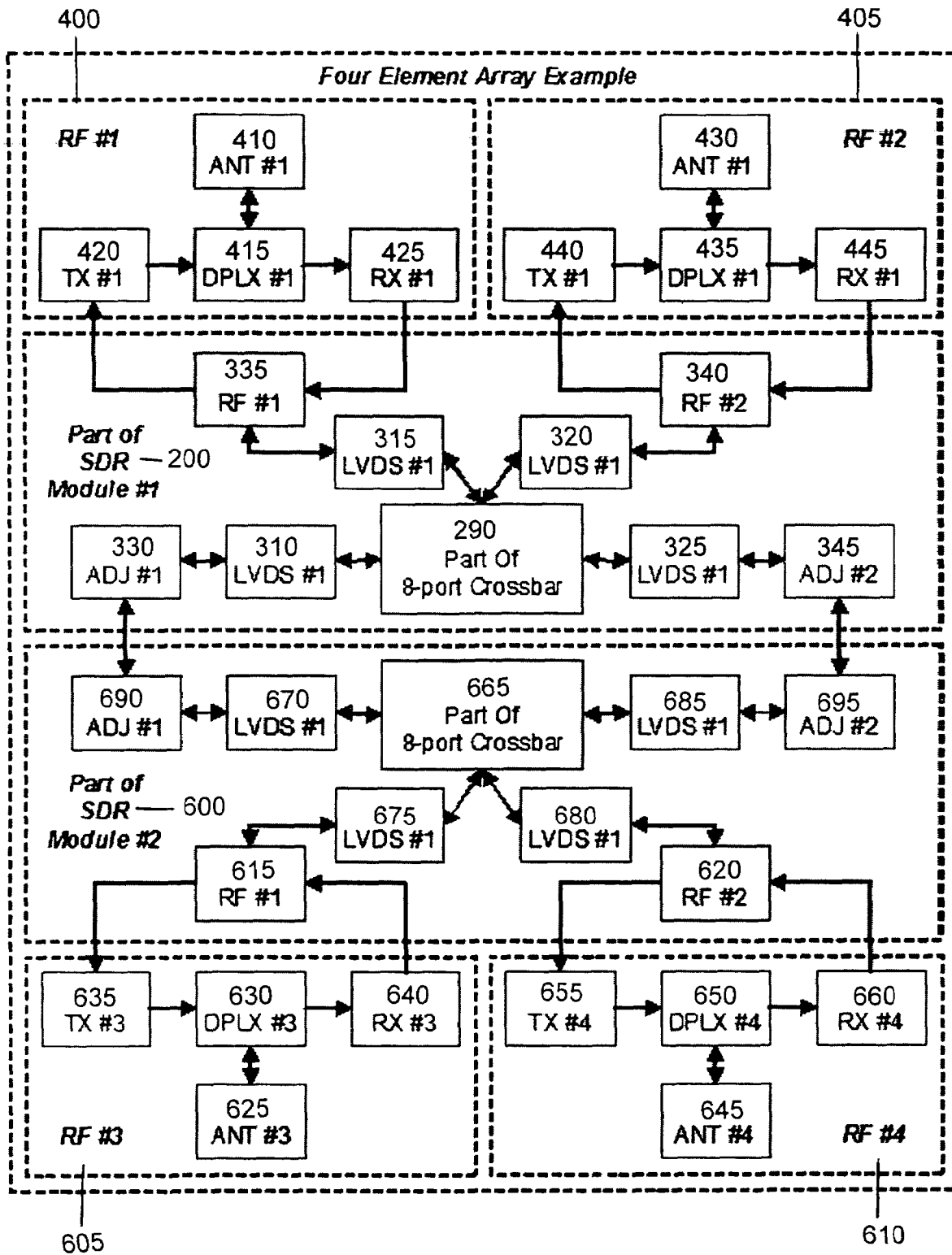
FIG. 6 shows a four element array embodiment.

Referring to FIG. 6, which is a further embodiment for the self-booting, dual channel SDR used to implement a four-element array, using two SDR modules, and four sets of antennas, transmitters and receivers. In this embodiment, SDR module Port RF #1 of the first SDR module 200 is connected to the serial digital interface of a digital radio transmitter Tx #1 420 and digital radio receiver Rx #1 425, which are connected to a diplexer 415 and antenna 410. SDR module Port RF #2 340 is connected to the serial interface of digital radio transmitter Tx #2 440 and digital radio receiver Rx #1 445, which are connected to a diplexer 435 and antenna 430.

A second SDR module 600 is coupled to the first SDR module 200, wherein second SDR module Port RF #1 615 is connected to the serial digital interface of a digital radio transmitter Tx #3 635 and digital radio receiver Rx #3 640, which are connected to a diplexer 630 and antenna 625. Second SDR module Port RF #2 620 is connected to the serial digital interface of a digital radio transmitter Tx #4 655 and digital radio receiver Rx #4 660, which are connected to a diplexer 650 and antenna 645.

The crossbars of the two SDR modules 290, 665 are "daisy chained" together by connecting either first SDR module Port ADJ #1 330 or first SDR module Port ADJ #2 345 to either the second SDR module Port ADJ#1 690 or second SDR module Port ADJ #2 695. Optionally, the unused Port of the first SDR module, such as ADJ #2 345 may be connected to the unused second SDR module Port ADJ #2 695, obtaining a "ring" network. It is also known in the art to incorporate a serializer/deserializer (SERDES) to allow for parallel-to-serial and serial-to-parallel processing for the bus connection.

Those skilled in the trade will readily acknowledge that additional SDR modules, transceivers, and antennas may be "daisy chained" together in a plurality of fashions, obtaining arbitrarily large antenna arrays in this fashion. For example, when operating as a phased array, any one of a plurality of protocols may be employed with the crossbar switch and LVDS transceivers, including but not restricted to proprietary protocols, TCP/IP, serial RapidIO™, Infiniband™, or Gigabit Ethernet.

Figure 7:
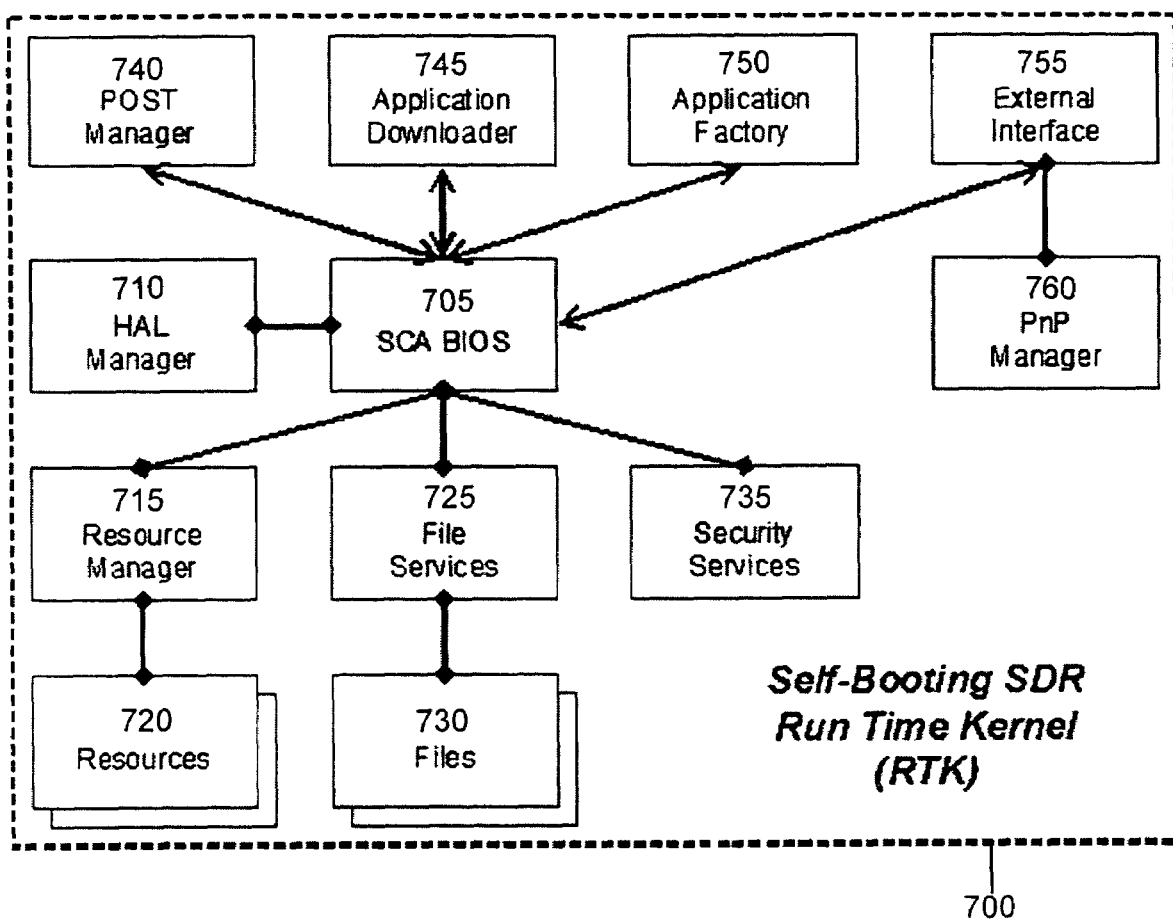
FIG. 7 illustrates a self-booting SCA run time kernel (RTK) interconnection between various modules.

Referring to FIG. 7 and referencing FIG. 3, which illustrates the self-booting SDR Run Time Kernel. In one embodiment, the SDR module includes a "minimum" basic input/output system (BIOS) 705, "built-in" functions programmed into the SDR module, and stored entirely on the module's internal file systems without need to access files from an external system such as the host's disk drive. The "minimum" BIOS is the BIOS needed to deploy a simple software-defined wireless communication devices on a public, private or tactical wireless service such as the amateur band, Citizens Band, "family talk" or first-responder emergency services. Since the BIOS is "minimum" by definition, the BIOS must be both extensible and scalable. Extensions to accommodate additional security, multi-media, quality of service (QoS) or other features may be added to the described SCA.

The BIOS 705 contains multiple run-time software modules. There is a Hardware Abstraction Layer (HAL) manager 710, which provides a method for providing run-time hardware abstraction for general purpose processors (GPP), application specific integrated circuits (ASIC), field programmable gate arrays (FPGA), digital signal processors (DSP), and other hardware for SDR such as those under development by the SDR Forum and other industry organizations. With HAL, SDR applications are computing platform neutral. This function interacts through the BIOS 705 with the module's resource manager 710 to the HAL software on the remote host CPU (not shown) or network server via the network interface (not shown). In one embodiment, the module-specific hardware resource information is based on an open standard for HAL developed by industry organizations such as the SDR Forum or OMG. In an alternative embodiment, the HAL standard is a de-facto standard for wireless devices established by manufacturers such as Sun Microsystems for Java, Palm Computing for Palm/OS or Microsoft for Windows CE and .NET.

There is a Resource manager 715, which provides information to the BIOS 705 about the characteristics and availability of module resources 720, identifies the resource as "unavailable" when allocated or failed, and identifies the resource as "free" when unallocated or de-allocated.

A File services 725 software module provides minimum file management to read, write, and erase files 730, allocate and de-allocate memory on file devices such as flash memory and RAM on the SDR module based on file operations such as read, write and erase, and perform "garbage collection" or memory re-organization of file devices on the SDR module.

An additional software module is the Security services 735. This function manages hardware and software security kernels within the SDR module and provides minimum security services to the BIOS 705. In one embodiment, security manager 735 maintains a security kernel version number and validates security checksum requests from the POST 740, Application Download 745 and Application Factory 750 functions for verification and validation (V&V) process to confirm integrity of SDR downloads and applications. This function inspects and confirms the integrity of the SDR module's current programming.

The POST manager 740 function initiates and manages the power-on self-test (POST) functions upon system boot-up, or upon a command by the module controller to initiate a self-test. The POST manager 740 receives resource configuration characteristics from the BIOS 705 and manages self-test functions via the BIOS 705.

There is an Application downloader 745 that controls downloading of SDR reconfiguration software via a "download" application programming interface (API) including over-the-air (OTA) downloads, and confirm security integrity of the download. A run-time method of initiating, transporting, inspecting, verifying and deploying reconfiguration source or binary code which may include over the air (OTA) code distribution. The download function should conform to one or more industry download API(s). Additional functions can include checking for LAB certification (e.g. UL, WIN-LAB), and calculation/verification of an integrity code (such as a checksum) for downloaded data.

The Application factory 750 is a piece of the SCA Core Framework function implemented on the SDR module. In one embodiment, SCA applications, such as waveform class files in Java, are pre-compiled by a master application factory running on the host CPU and launched by the application factory 750 on the SDR module. The application factory launches the application using resources, file services and security services through the BIOS 705. In another embodiment, the application factory 750 employs middleware such as a lightweight object request broker (ORB) or Java remote method invocation (RMI). In an alternative embodiment, the application factory 750 is replaced by a container application, such as a micro-browser, used to host and launch remotely compiled methods such as Java "applets".

There is an external interface 755 module that is responsible for all external interfaces to the module. In one embodiment, the interfaces include a plug-and-play (PnP) interface between the module and the host system, and four serial digital interfaces to digital transceivers and/or adjacent modules. The PnP interface manager of the host provides conformance to one of a plurality of PnP industry specifications including but not limited to Peripheral Component Interconnect (PCI), Universal Serial Bus (USB), and IEEE 1394 "Firewire", depending on the type of PnP interface connector used. The external interface 755 is also responsible for distributing system clock timing signals over the PnP and LVDS interfaces.

Referring again to FIG. 3, in operation, the programming of the SDR module is accomplished by employing the SCA Run-Time Kernel (RTK). An application program is executed by the host CPU 210 to download source code for programming the module which may be stored in host random access memory 220, on disk 225 interfacing with the host CPU via the host PCI bus 215 or on a network file server (not shown). The host CPU 210 establishes a communication path with the module's RISC CPU 265 via the host PCI bus 215, the security module 230, the Plug and Play (PnP)/hot swap PCI adapters 235, 250, PCI bus 255, and PCI adapter 260.

Software programs according to one embodiment which must be permanently stored on the module, such as "boot code" needed for module initialization from power-up, are stored in FLASH memory 270. The boot code includes a minimum Software Communications Architecture (SCA) run time kernel, which may include a multiplicity of software components such as a POSIX compliant operating system micro-kernel, basic input/output system (BIOS), object request broker (ORB), hardware abstraction layer (HAL) application programming interfaces (API), SDR download API, radio control API, antenna control API, FPGA programming API, power-on self test (POST), and diagnostic/prognostic functions such as IEEE 1149.1 boundary scan support and thermal sensor support.

The download of waveform and adaptive processing is accomplished as follows. Once the SCA RTK has been "booted", the module is ready to accept software downloads to configure various components of the module 200 including the crossbar switch 290, software defined radio (SDR) transceiver functions 295, 300, and adaptive processing functions 305. These downloads may be in the form of Verilog or VHSIC Hardware Definition Language (VHDL) intellectual property (IP) cores for FPGA. Each different radio waveform has a unique configuration of FPGA gates and registers needed for its instantiation. Also, adaptive processing features such as antenna diversity combining, adaptive interference mitigation, beam forming, etc. instantiated on adaptive processor 305, are dependent on the waveforms instantiated on the reconfigurable transceivers 295, 300. Thus reconfiguration of waveforms on reconfigurable transceivers 295, 300 generally require reconfiguration of the adaptive processing algorithms on adaptive processor 305, as well as reconfiguration of the crossbar switch 290 to provide the necessary data flow paths.

In one embodiment, the software downloads for the FPGA comply with interface standards set by the SCA, and the download API standard established by the Software Defined Radio Forum (SDRF). The source code is validated after download by the module. Source code for "default" transceiver waveforms may optionally be stored on Flash RAM 270, which provides the ability to instantiate a default radio configuration in the event of a system crash.

Once the software-defined transceivers 295, 300, adaptive processing unit 305 and crossbar switch 290 have been programmed, the module operates as a conventional (non-SDR) two-channel, dual-mode radio module. One possible configuration is simultaneous operation of Bluetooth (Specification 1.1) and Wireless Local Area Networks (WLAN, IEEE 802.11) waveforms instantiated on transceivers 295, 300. Since these two waveforms operate in the same frequency bands, a multiplicity of means to mitigate interference between the two waveforms have been developed. One or more of these means may be instantiated by downloading appropriate software to the adaptive processor 305 and crossbar switch 290. In some instantiations, up to four RF signals may be received and generated for the dual mode radio. In one instantiation, RF#1 and RF#2 may be used to receive and transmit a diversity signal using two antennas and two RF signal paths to transceiver #1 295 by way of LVDS transceivers 310, 315, crossbar switch 290, and adaptive processor 305. In the same instantiation, RF#3 and RF#4 may be similarly used to receive and transmit a diversity signal using two antennas and two RF signal paths to transceiver #2 300 by way of LVDS transceivers 320, 325, crossbar switch 290, and adaptive processor 305.

In other instantiations (such as IS-95 CDMA or GSM/EDGE), the four antennas and RF chains may be organized as a four element array, used to support two independent CDMA transceiver channels simultaneously from the same device. In such an instantiation, the four RF #1-4 may be used to receive and transmit four signals using four antennas and four RF signal paths to transceivers #1-2 295, 300 by way of LVDS transceivers 310-325, crossbar switch 290, and adaptive processor 305, with digital beamforming being performed by the adaptive processor 305.

When power is applied to the module, the module initiates a power-on self test (POST) and initiates a self-booting sequence of a Software Communications Architecture (SCA) run-time kernel (RTK). In one embodiment, the SCA RTK is implemented as a core of an embedded processor on a reconfigurable logic device such as a field programmable gate array (FPGA) or programmable logic device (PLD).

The embedded processor's instruction set, registers, and data flow paths, and input/output ports support the needs of the SCA RTK. In one embodiment, implementation is reduced to the minimum number of gates and registers required to support the needs of a "minimum" SCA RTK, minimizing the cost, size, and power required for its implementation.

The module in one embodiment permanently stores the basic input/output system software (BIOS) needed by the SCA RTK, using an application specific integrated circuit (ASIC), FPGA, PLD, battery operated random access memory (RAM), FLASH RAM, programmable read-only memory (PROM), or some variant of one of these devices, and in one embodiment, the BIOS characteristics.

Figure 8B:
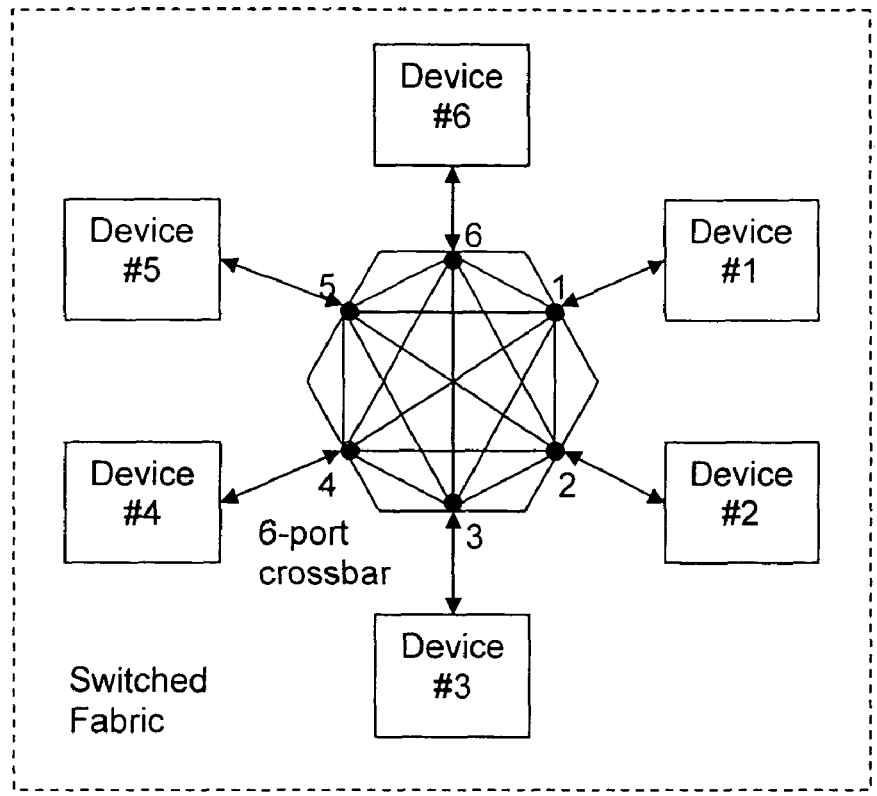
FIG. 8b shows a ring interconnect of the various SDR components of the programmable devices.
Figure 8A:
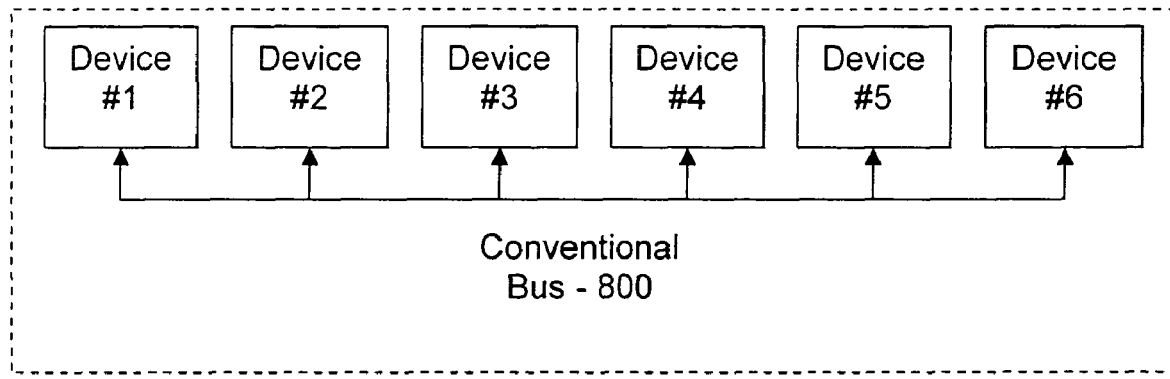
FIG. 8a shows a conventional bus interconnect for a programmable device linking the SDR components.

As described herein, the crossbars of the SDR modules allow a plurality of devices resident on the FPGA to be coupled together and obtain a variety of configurations. There is some art discussing the use of switched fabric connectivity between a number of FPGAs. However, the implementation of switched fabric internal to the FPGA for the SDR is yet another aspect of the present invention. Referring to FIGS. 8*a* and 8*b*, two schemes for internal coupling is shown. FIG. 8*a* shows the conventional bus connection having a single bus 800 interconnected to multiple devices on the same FPGA, wherein all the devices #1-N share the same physical layer 800. The Devices #1-N in this description refer to such things as memory, processor, I/O, multimedia, and file storage. While the present invention can interconnect devices in such a manner, the crossbar switching and design allow other options.

Referring to FIG. 8*b*, a 6-port crossbar configuration coupling six devices is depicted. It should be understood that number of devices depends upon a number of factors for a particular application and the technology, and any reference to a particular number is for purposes of explanation and should not to be construed as a limitation for the implementation described herein. The ring connection between the six devices (Devices #1-Devices #6) of the programmable logic device or FPGA shows that each device is a bi-directional port. In one embodiment for a LVDS serial system, the ports are 4-wire bi-directional ports using the LVDS PHY (physical) layer. The ring configuration allows three pairs of simultaneous connections as described herein. The switched fabric using this 6-port crossbar is thus three times faster than the conventional bus of FIG. 8*a*. And, coupling crossbars together in larger networks allows even greater performance increases.

There is some art related to a traditional pipeline architecture using a dual port RAM (DRAM) and cache to provide communications between processors in SDR systems. This scheme has certain speed limitations as opposed to the switched fabric implementation described herein but does not offer changeable interconnections for multiple SDR modules.

A flowchart for one embodiment is shown in FIG. 9 illustrating a top level processing perspective of the self-booting process, the loading of a default waveform, and the download, verification, storage and loading of a new waveform. The start 900 commences with some event, such as power-up, that triggers the module CPU to execute the run-time kernel and commence execution of the CPU power-on self test (POST) 905. There is initial check of certain criteria 910 which would indicate some internal errors or other problems that would prevent the device from functioning. The built-in tests (BIT) perform verification of those components that are testable and accessible. If the verifications step fails, an error report of the failure is reported 995 and processing ends 1005. If the verification step passes, processing continues on to run boundary scan POST 915. Once again, there is a verification check 920 and failure results in logging the error 995 and end of processing 1005. If the boundary scan passes, the next step is the checksum 925 and the security checksum is validated 930. A failure is processed as already described. If the checksum test is successful, the processing checks to identify a PnP interface 935. The interface detection is verified 940 and failure commences as described. If there is a PnP interface detected, the system tries to establish a host interface 945 and perform certain functions such as loading SCA BIOS 960 and loading the default waveforms 955, and passing the hardware abstraction layer (HAL) values identifying the hardware resource characteristics and availability to the host 950. The passing of the HAL values 950 checks whether a download is available 965. If there is no download available the system loops until a download is available. If a download is available, a new waveform is downloaded 970 and verified 975. The verification test 980 may result in a failure, which proceeds to the failure route of logging and reporting the error 995 and ending 1005. If the verification test 980 is positive, the new application is stored 985 and the new waveform is loaded. Finally, the events and data are logged 1000 and the channel is ready for processing.

One application which may use the system of the present invention is a Dual Function Radio (DFR) or Multi-Mode Radio for Wireless Local Area Network (LAN) and Bluetooth. The dual function chipset may employ both Wireless Local Area Networks (WLAN) and Bluetooth in one integrated device. The development of a dual mode Bluetooth/WLAN radio node guarantees connectivity and operation in commercial and military environments. The device may further employ "smart radio" methods to provide the intelligence to know when to communicate (on-demand) to a WLAN or Bluetooth network with no operator intervention with the obvious criteria of operating collocated with no concern of interference and its detrimental effects on communications. The device is also capable of coordinating and transferring information from a WLAN network to a Bluetooth network. WLAN and Bluetooth technology provide for the rapid setup and tear down of communication networks and this capability could be of aid greatly in times of national emergency when the commercial network infrastructure has been damaged.

Advantages of the SDR approach of the present invention include interoperability and the ability to reconfigure the chipsets to accommodate changes in commercial segments. It also enables the addition and modification of interference mitigation algorithms, including co-site and co-channel interference cancellation methods and cross-layer protocol stack optimization methods such as adaptive medium access control (MAC). The present SDR module can be used as a reference design and test platform for demonstrations of waveforms, protocol stacks, and interference mitigation methods There are numerous examples and variations associated with the present invention. With respect to FPGA's, the Xilinx Virtex II Pro, part number XC2VP7, may be employed to implement the self-booting SDR module, which are embedded within a field programmable gate array (FPGA). The XC2VP7 device contains eight transceivers, used to provide gigabit I/O between the digital transceivers and modems, and between the SDIC and its host device. It also contains a PowerPC 405 32-bit RISC CPU that can be programmed for Smart Radio functionality. The XC2VP7 device comes in a package as small as 23×23 mm when packaged in the FG456 flat-pack form factor. This small package fits well in PCMCIA packages, and contains 248 user available I/O pins.

The crossbar switch core for the FPGA can be from many sources, including the Xilinx Crossbar Switch core, which is a programmable parameterizable custom design implementing digital cross-point switching functions on Xilinx Virtex-™ and Virtex-II Pro™ FPGA. As described herein, one of the implementations of the present invention employs the crossbar switch for use in digital cross-connects between processors and I/O nodes.

In one implementation, the Java processor core (hardware stack) for the embedded CPU in the FPGA may be configured as a connected device configuration (CDC) or connection limited device configuration (CLDC) hardware Java stack, that is, a processor which substitutes for a Java virtual machine, using a specialized RISC processor which executes Java byte code (in Java Class files) as native mode instructions. An open source core, available for Xilinx and Altera FPGA's, is JOP.

One implementation uses a self-booting RTK that provides interoperability with the SCA. An open source SCA Reference Implementation (SCARI) can be used as is known to those in the art. One implementation employs Java 2 Standard Edition (J2SE) and CORBA 2.2. In a further implementation, the RTK includes a CDC or CLDC hardware Java 2 stack, on which SCA methods may be invoked.

One or more waveforms may be determined by a transfer of software from a host (download), and stored within the module using a reconfigurable logic or memory device, such as FLASH random access memory (RAM). In one embodiment, the method of downloading and storing waveforms complies with a download application programming interface (API) standard such as the Software Communication Architecture (SCA).

In one embodiment, two or more waveforms may be stored in such a way that the module may be rapidly switched from one stored waveform to another (switcher). In a further embodiment, the switcher method to select stored waveforms complies with a switcher API standard such as the SCA. When inserted into a Plug and Play (PnP) aware device, the module supports the host's PnP configuration.

In operation, one or more waveforms may be determined by a transfer of software from a host (download), and stored within the module using a reconfigurable logic or memory device, such as FLASH random access memory (RAM). In one embodiment, the method of downloading and storing waveforms complies with a download application programming interface (API) standard such as the Software Communication Architecture (SCA). In another embodiment, two or more waveforms may be stored in such a way that the module may be rapidly switched from one stored waveform to another (switcher). In a further embodiment, the switcher method to select stored waveforms complies with a switcher API standard such as the SCA.

Another implementation is to provide ease of operation, and when inserted into a Plug and Play (PnP) aware device, the module supports the host's PnP configuration. When power is applied to the module, the module initiates a power-on self test (POST) and initiates a self-booting sequence of a Software Communications Architecture (SCA) run-time kernel (RTK). In one embodiment, the SCA RTK is implemented as a core of an embedded processor on a reconfigurable logic device such as a field programmable gate array (FPGA) or programmable logic device (PLD). The embedded processor's instruction set, registers, and data flow paths, and input/output ports support the needs of the SCA RTK. In another embodiment, implementation is reduced to the minimum number of gates and registers required to support the needs of a "minimum" SCA RTK, minimizing the cost, size, and power required for its implementation.

The module permanently stores the basic input/output system software (BIOS) needed by the SCA RTK, using an application specific integrated circuit (ASIC), FPGA, PLD, battery operated random access memory (RAM), FLASH RAM, programmable read-only memory (PROM), or some variant of one of these devices, and in one embodiment, the BIOS characteristics.

The user of the host device may select one or more stored waveforms for instantiation in the SDR module by actuation of a single button or plurality of buttons. The button or plurality of buttons may be either actual (physical) buttons, as on a radio handset or user interface control panel, or virtual buttons on a host graphical user interface (GUI). In one embodiment, the radio button actuation interacts with the SDR module using an industry standard API such as the Defense Advanced Research Projects Administration (DARPA) Global Mobile (GLOMO) Radio API.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A self-booting software defined radio (SDR) module that interfaces with a host system, said module comprising:
   a modulation/demodulation section with a stored run-time kernel, wherein a processing unit of said modulation/demodulation section executes said run time kernel;
   an interface mechanism coupling said host system to said module, wherein said host system provides a plug-and-play capability and a set of reconfiguration information, and wherein said interface mechanism is a plug-and-play interface mechanism;
   a front end unit receiving communications signals and processing said communications signals using said reconfiguration information; and
   a multi-port crossbar coupled to said front end unit.

2. A self-booting software defined radio (SDR) module that interfaces with a host system, said module comprising:
   a modulation/demodulation section with a stored run-time kernel, wherein a processing unit of said modulation/demodulation section executes said run time kernel;
   an interface mechanism coupling said host system to said module, wherein said host system provides a plug-and-play capability and a set of reconfiguration information, and wherein said interface mechanism is a plug-and-play interface mechanism; and
   a front end unit receiving communications signals and processing said communications signals using said reconfiguration information; said
   modulation/demodulation section comprising a high speed fabric.

3. A software reconfigurable radio/wireless module employing a software communications architecture (SCA), comprising:
   at least one processor unit;
   at least one memory unit coupled to said processor unit by a control bus;
   a plurality of reconfigurable elements;
   an interface mechanism for transferring reconfiguration information from a host device to said reconfigurable elements, wherein said interface mechanism is a plug-and-play interface mechanism;
   at least one radio frequency interface block; and
   at least one multi-port reconfigurable crossbar switch with bi-directional ports coupling to said radio frequency interface block and to said processor unit.

4. The software reconfigurable radio/wireless module according to claim 3, wherein said radio frequency interface comprises at least one switchably coupled antenna.

5. The software reconfigurable radio/wireless module according to claim 3, wherein said multi-port crossbar switch uses a serial digital interface.

6. The software reconfigurable radio/wireless module according to claim 3, wherein said reconfigurable elements comprise reconfigurable transceivers.

7. The software reconfigurable radio/wireless module according to claim 3, wherein said multi-port crossbar switch uses a serial digital interface.

8. A switched fabric software defined radio module, comprising:
   at least two reconfigurable logic devices on said module, wherein said reconfigurable logic devices are each comprising:
      a front end unit for transmission and reception of information signals;
      a processing unit;
      a memory section;
      a crossbar switch; and
   an internal fabric interface, wherein said processing unit, said memory section, and said crossbar switch are coupled to said internal fabric interface.

9. The switched fabric software defined radio module according to claim 8, wherein said crossbar switch is configured as a ring.

10. The switched fabric software defined radio module according to claim 8, wherein said devices further comprises a software communications architecture (SCA) run time kernel.

* * * * *